United States Patent
Kawano

(10) Patent No.: US 10,508,327 B2
(45) Date of Patent: Dec. 17, 2019

(54) MOLD STEEL AND MOLD

(71) Applicant: DAIDO STEEL CO., LTD., Nagoya-shi, Aichi (JP)

(72) Inventor: Masamichi Kawano, Aichi (JP)

(73) Assignee: DAIDO STEEL CO., LTD., Aichi (JP)

( * ) Notice: Subject to any disclaimer, the term of this patent is extended or adjusted under 35 U.S.C. 154(b) by 304 days.

(21) Appl. No.: 15/450,352

(22) Filed: Mar. 6, 2017

(65) Prior Publication Data
US 2017/0260611 A1    Sep. 14, 2017

(30) Foreign Application Priority Data

Mar. 11, 2016 (JP) ................................. 2016-048581
Mar. 2, 2017 (JP) ................................. 2017-039355

(51) Int. Cl.

| | | |
|---|---|---|
| C22C 38/00 | (2006.01) | |
| C22C 38/60 | (2006.01) | |
| B29C 33/38 | (2006.01) | |
| C21D 9/00 | (2006.01) | |
| C22C 38/02 | (2006.01) | |
| C22C 38/04 | (2006.01) | |
| C22C 38/06 | (2006.01) | |
| C22C 38/42 | (2006.01) | |
| C22C 38/44 | (2006.01) | |

(Continued)

(52) U.S. Cl.
CPC ............. *C22C 38/60* (2013.01); *B29C 33/38* (2013.01); *C21D 6/004* (2013.01); *C21D 6/02* (2013.01); *C21D 9/0068* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C21D 1/18* (2013.01)

(58) Field of Classification Search
None
See application file for complete search history.

(56) References Cited

U.S. PATENT DOCUMENTS

| | | |
|---|---|---|
| 5,641,453 A | 6/1997 | Hackl et al. |
| 6,896,847 B2 | 5/2005 | Sandberg et al. |

(Continued)

FOREIGN PATENT DOCUMENTS

| | | |
|---|---|---|
| CA | 2869798 A1 | 5/2017 |
| EP | 2875926 A1 | 5/2015 |

(Continued)

OTHER PUBLICATIONS

Extended European Search Report from Patent Application No. 17160327.7 dated Aug. 22, 2017.

(Continued)

*Primary Examiner* — Anita Nassiri-Motlagh
(74) *Attorney, Agent, or Firm* — Greenblum & Bernstein, P.L.C.

(57) ABSTRACT

The present invention relates to a mold steel having a composition including, in terms of mass %: 0.220% ≤C≤0.360%; 0.65%≤Si<1.05%; 0.43%≤Mn≤0.92%; 0.43% ≤Ni≤0.92%; 0.67%≤0.5Mn+Ni≤1.30%; 10.50%≤Cr <12.50%; 0.05%≤Mo<0.50%; 0.002%≤V<0.50%; 0.001% ≤N≤0.160%; and 0.300%≤C+N≤0.420%, with the remainder being Fe and unavoidable impurities.

4 Claims, 7 Drawing Sheets

(51) Int. Cl.
*C22C 38/46* (2006.01)
*C22C 38/48* (2006.01)
*C22C 38/50* (2006.01)
*C22C 38/52* (2006.01)
*C22C 38/54* (2006.01)
*C21D 6/00* (2006.01)
*C21D 6/02* (2006.01)
*C21D 1/18* (2006.01)

(56) References Cited

U.S. PATENT DOCUMENTS

2004/0101430 A1 5/2004 Sandberg et al.
2010/0276038 A1 11/2010 Grellier

FOREIGN PATENT DOCUMENTS

| | | |
|---|---|---|
| JP | S57-73171 A | 5/1982 |
| JP | S57-73172 A | 5/1982 |
| JP | S58-113352 A | 7/1983 |
| JP | H05070893 A | 3/1993 |
| JP | H08-253846 A | 10/1996 |
| JP | H11033778 A | 9/1999 |
| JP | 2004-503677 A | 2/2004 |
| JP | 2007-197784 A | 8/2007 |
| JP | 2007-314815 A | 12/2007 |
| JP | 2008-297602 A | 12/2008 |
| JP | 2009-167476 A | 7/2009 |
| JP | 2010-539325 A | 12/2010 |
| KR | 2003-0010711 A | 2/2003 |
| KR | 2010-0059965 A | 6/2010 |
| WO | 0196626 A1 | 12/2001 |

OTHER PUBLICATIONS

Korean Office Action issued with respect to Korean Application No. 10-2017-0030367, dated Jun. 14, 2018.
Office Action issued in corresponding Chinese patent application 201710141591.8 dated Feb. 2, 2019 (with English translation).
Office Action issued in the corresponding Korean patent application 10-2017-0030367 dated Jan. 28, 2019 (with English translation)
Tadao et al., "Mold 5 Materials and Thermal Treatment Thereof" p. 180, China Machine Press, Feb. 1982.
Office Action in corresponding Chinese patent application CN 201710141591.8 dated Jul. 25, 2019 (with English translation).

MOLD STEEL AND MOLD

FIELD OF THE INVENTION

The present invention relates to a mold steel and a mold thereof, and particularly relates to a mold steel excellent in hardness and corrosion resistance, and a mold thereof.

BACKGROUND OF THE INVENTION

In recent years, plastic products with which hard glass fiber is mixed for attaining high strength have increased. In injection molding of such plastic products, wear of a mold is actualized. When the mold wears, surface quality of the products is deteriorated by transfer thereof to the products. The products deteriorated in the surface quality are unmarketable and discarded. It is therefore important that the mold does not wear, and in order to ensure wear resistance, high hardness is required for the mold.

Conventionally, the hardness of the mold used for the injection molding of the plastics with which the hard glass fiber is mixed is mainly from 45 to 55 HRC (from the viewpoint of workability, the mold tempered to a state where the hardness is lower than the above is used in some cases).

In the mold for molding the plastic product, flow passages for temperature adjustment are generally provided in the inside thereof, and cold water, hot water, vapor or the like is allowed to flow through the flow passages to perform temperature control of the mold. However, in the mold with low corrosion resistance, the flow passages are narrowed with rust, and it becomes unable to ensure a predetermined flow rate (the cold water, the hot water, the vapor or the like), resulting in interfering with the temperature control. Further, when the rust is more increased, the flow passages are clogged with the rust, and the flow passages become useless. Furthermore, in the mold with low corrosion resistance, a crack is generated with a rust part as a starting point, and development thereof causes breakage of the mold or leakage of the cold water, the hot water, the vapor or the like from the crack penetrating to a design surface, which sometimes has an adverse influence on the resin product. In addition, a surface of the mold is sometimes corroded by a gas generated from the resin to be molded. When the corroded part is transferred to the product, the surface quality thereof is deteriorated. For such reasons, high corrosion resistance is required for the mold.

Additionally, during use thereof as the mold, thermal stress or mechanical stress is repeatedly applied thereto. In order to avoid breakage thereof under such a severe use environment, fineness of crystal grains is required for the mold.

The mold for plastic injection molding which is required to have the hardness and the corrosion resistance (also including parts constituting a part of the mold) is generally produced through steps of melting→refining→casting→homogenizing heat treatment→hot working→intermediate heat treatment→annealing→machine work 1 (rough machining)→quenching→tempering→machine work 2 (finish machining)→mirror polishing or texturing.

In addition, surface modification (such as PVD, CVD, nitriding, shot blasting or shot peening) is applied in some cases, as needed.

In this production process, (1) no precipitation of grain boundary carbides after the hot working, (2) good annealability and (3) no precipitation of pearlite during the quenching are required for a mold steel.

In the hot working, the steel is in a state of a γ single phase, and all of carbon and carbide forming elements are solid-soluted in a matrix. During cooling after the hot working, the solid solubility of the elements is decreased by a reduction in temperature, and the carbides are sometimes precipitated in γ grain boundaries. The grain boundary carbides precipitated after the hot working cannot be removed by subsequent heat treatment (annealing, quenching or tempering). The grain boundary carbides become foreign matter dispersed in the matrix, which is an obstacle for obtaining a uniform and smooth surface by the mirror polishing. Furthermore, the grain boundary carbides also become starting points of breakage due to repeated stress during use thereof as the mold. Therefore, "(1) difficulty in precipitation of grain boundary carbides" is required.

When the annealability is poor, complicated annealing conditions over a long time are necessary for softening, which causes an increase in material cost. It is therefore required that softening to a state capable of performing the above-mentioned machine work 1 is achieved by simple heat treatment, that is, "(2) good annealability".

Also pearlite precipitated during the quenching cannot be removed by the subsequent tempering. Pearlite becomes foreign matter dispersed in the matrix, which is an obstacle for obtaining the uniform and smooth surface by the mirror polishing. Furthermore, pearlite also becomes starting point of breakage due to repeated stress during use thereof as the mold. Therefore, "(3) difficulty in precipitation of pearlite" is required.

Conventionally, JIS SUS420J2 has been frequently used in a mold or parts thereof requiring corrosion resistance and a high hardness of about 52 HRC. The components thereof are 0.4% of C, 0.9% of Si, 0.4% of Mn, 0.2% of Ni, 13% of Cr and 0.015% of N. The SUS420J2 satisfies the condition of (2) good annealability described above, and is softened to 87-96 HRB only by simple annealing treatment of cooling it from 850-950° C. to 650° C. at 15-60° C./Hr, followed by natural cooling.

However. SUS420J2 does not satisfy the above-mentioned conditions of (1) and (3).

In particular, even when quench-cooled from a quenching temperature of 1,030° C. at a high rate of 50° C./min, the precipitation of pearlite cannot be avoided.

The quench-cooling rate in the inside of the mold is generally from 10 to 40° C./min (in a temperature range of 550 to 850° C. at which pearlite is precipitated), and therefore, the precipitation of pearlite becomes unavoidable in the inside of the mold of SUS420J2 to increase a risk of breakage during use thereof as the mold.

To the above-mentioned problem, high N stainless steel in which the components of SUS420J2 are largely changed is sometimes used. In this steel, the above-mentioned problem of (1) is avoided by decreasing the C content. The N content is increased, thereby compensating for a decrease in strength due to decreasing the C content. Also, in this steel, the above-mentioned problem of (3) is avoided by increasing the Mn content or the Ni content together with decreasing the C content. However, as a result of such component adjustment, quenchability is excessively increased, and therefore, the above-mentioned condition of (2) cannot be achieved. As a result, cost of the annealing or the machine work 1 (rough machining) is increased, or the time of delivery is forced to be delayed. Further, a γ memory effect is developed during the quenching because of its poor annealability, and coarse grains during the hot working are taken over also during the quenching, resulting in easy generation of cracks during use as the mold.

As described above, the mold for plastic injection molding requires (1) no precipitation of grain boundary carbides after hot working, (2) good annealability and (3) no precipitation of pearlite during quenching, in addition to the high hardness and the high corrosion resistance. However, no mold steel and mold that satisfy these characteristics have hitherto been provided.

The following Patent Documents 1 to 7 disclose steels containing 10.5 to 12.5% of Cr, which is within the range of the present invention. However, all of these steels are not steels for plastic injection molding molds, and different from the present invention in use thereof, as shown below. Furthermore, these steels are different also in essential elements and characteristics under consideration.

Patent Document 1 discloses a free-cutting tool steel having 40 to 47 HRC. However, the steel described in Patent Document 1 is different from the present invention in that it is silent on the plastic injection molding mold with the high hardness and the high corrosion resistance, that S is essentially added for free-cutting, and that the hardness level is lower than that of the present invention. Assuming this steel to be applied to the plastic injection molding mold, it is easily presumed that predetermined mirror finishing properties cannot be ensured due to an influence of the free-cutting component, and that wear resistance thereof is poor. In addition, an example of containing Cr in a range of 7.05 to 15.0% is not disclosed, and therefore, an effect of containing Cr in the above range is not demonstrated. There is also no attention to the annealability or the precipitation of the grain boundary carbides and pearlite.

Patent Document 2 discloses a free-cutting tool steel having 45 to 63 HRC. However, the steel described in Patent Document 2 is also different from the present invention in that it is silent on the plastic injection molding mold with the high hardness and the high corrosion resistance, that S is essentially added for free-cutting, and that the hardness level is lower than that of the present invention. Assuming this steel to be applied to the plastic injection molding mold, it is easily presumed that predetermined mirror finishing properties cannot be ensured due to an influence of the free-cutting component. There is also no attention to the annealability or the precipitation of the grain boundary carbides and pearlite.

Patent Document 3 discloses an alloy steel for hot working. However, the steel described in Patent Document 3 is silent on the plastic injection molding mold with the high hardness and the high corrosion resistance, and basic components are C, Si, REM and N in some cases. It is therefore easily presumed that quenching is not attained, and moreover, that the corrosion resistance is not obtained. In addition, for Cr as a selective element, an example of containing Cr within a range of 2.5 to 13.0% is not disclosed, and therefore, an effect of containing Cr within the above range is not demonstrated. There is also no attention to the annealability or the precipitation of the grain boundary carbides and pearlite.

Patent Document 4 discloses a steel for a die-casting die having a carbide area ratio of 5.5 to 30% and having excellent erosion resistance. However, the steel described in Patent Document 4 is different from the present invention in that Ni is not essential and is added in an amount of as low as 0.2% (Example), even if added, which does not demonstrate an effect of the high Ni content, and that although Mo+0.5W is essential, it is added in an amount of as large as at least 1.95% (Example), which does not demonstrated an effect of the low Mo content. In addition, an extremely large amount of C is contained because carbides are formed in large amounts. When the steel is applied to the plastic injection molding mold, it is easily presumed that the mirror finishing properties and the corrosion resistance are deteriorated due to an influence of the carbides, and that breakage due to the carbides serving as starting points is generated. There is also no attention to the annealability or the precipitation of the grain boundary carbides and pearlite.

Patent Document 5 discloses a spring steel wire having a diameter of 4.5 to 20 mm. However, the steel wire described in Patent Document 5 is different from the present invention in that it is silent on the plastic injection molding mold, and that V is not essential.

Even when V is selectively added, it is added in an amount of as large as 0.5% (Example), which does not demonstrated an effect of the low V content. Needless to say, the steel wire having a diameter of 4.5 to 20 mm cannot be applied to the mold. There is also no attention to the annealability or the precipitation of the grain boundary carbides and pearlite.

Patent Document 6 and Patent Document 7 disclose oil well stainless steel pipes. The stainless steel pipes described in these Patent Documents are different from the present invention in that these are silent on the plastic injection molding mold, and that Ni, Mo and V are not essential. Furthermore, the content of Si is as low as 0.31% or less (Example), which does not demonstrate an effect of the high Si content. The amount of Ni selectively added is as high as at least 1.63% (Example), which does not demonstrate an effect of the low Ni content. The amount of Mo selectively added is as high as at least 0.75% (Example), which does not demonstrate an effect of the low Mo content. Needless to say, the steel pipes cannot be applied to the mold. There is also no attention to the annealability or the precipitation of the grain boundary carbides and pearlite.

On the other hand, the following Patent Document 8 and Patent Document 9 disclose high Cr steels for plastic injection molding molds. However, in the steels described in these Patent Documents, the amount of Cr added is as high as 12.5% or more, and therefore, the steels are different from the present invention.

In addition, Patent Document 10 discloses a plastic injection molding mold steel which overlaps with the present invention in the amount of Cr added. However, the present invention is directed to the component ranges of Si, Mn and Ni which are not disclosed as Examples in Patent Document 10, and finds effects not obtained by the technique disclosed in this Patent Document.

Patent Document 1: JP-A-57-73171
Patent Document 2: JP-A-57-73172
Patent Document 3: JP-A-58-113352
Patent Document 4: JP-A-2007-197784
Patent Document 5: JP-A-2007-314815
Patent Document 6: JP-A-2008-297602
Patent Document 7: JP-A-2009-167476
Patent Document 8: JP-A-8-253846
Patent Document 9: JP-T-2004-503677
Patent Document 10: JP-T-2010-539325

SUMMARY OF THE INVENTION

The present invention has been made in view of circumstances as described above, and an object thereof is to provide a mold steel having difficulty in precipitation of grain boundary carbides, good annealability and difficulty in precipitation of pearlite, when a mold is produced, and having high hardness, excellent corrosion resistance and fine prior austenite crystal grains, when it has been formed into a mold; and a mold thereof.

Namely, the present invention relates to the following items (1) to (8).

(1) A mold steel having a composition including, in terms of mass %:

$0.220\% \leq C \leq 0.360\%$;
$0.65\% \leq Si < 1.05\%$;
$0.43\% \leq Mn \leq 0.92\%$;
$0.43\% \leq Ni \leq 0.92\%$;
$0.67\% \leq 0.5Mn + Ni \leq 1.30\%$;
$10.50\% \leq Cr < 12.50\%$;
$0.05\% \leq Mo < 0.50\%$;
$0.002\% \leq V < 0.50\%$;
$0.001\% \leq N \leq 0.160\%$; and
$0.300\% \leq C + N \leq 0.420\%$, with the remainder being Fe and unavoidable impurities.

Usually, in the mold steel, components shown below are contained as unavoidable impurities in the following ranges.

$P \leq 0.05\%$, $S \leq 0.006\%$, $Cu \leq 0.30\%$, $Al \leq 0.10\%$, $W \leq 0.30\%$, $O \leq 0.01\%$, $Co \leq 0.30\%$, $Nb \leq 0.004\%$, $Ta \leq 0.004\%$, $Ti \leq 0.004\%$, $Zr \leq 0.004\%$, $B \leq 0.0001\%$, $Ca \leq 0.0005\%$, $Se \leq 0.03\%$, $Te \leq 0.005\%$. $Bi \leq 0.01\%$, $Pb \leq 0.03\%$, $Mg \leq 0.02\%$, $REM \leq 0.10\%$, etc.

(2) The mold steel according to (1), further including, in terms of mass %, at least one of:

$0.30\% < W \leq 5.00\%$; and
$0.30\% < Co \leq 4.00\%$.

(3) The mold steel according to (1) or (2), further including, in terms of mass %, at least one of:

$0.004\% < Nb \leq 0.100\%$;
$0.004\% < Ta \leq 0.100\%$;
$0.004\% < Ti \leq 0.100\%$; and
$0.004\% < Zr \leq 0.100\%$.

(4) The mold steel according to any one of (1) to (3), further including, in terms of mass %:

$0.10\% < Al \leq 1.20\%$.

(5) The mold steel according to any one of (1) to (4), further including, in terms of mass %:

$0.30\% < Cu \leq 3.0\%$.

(6) The mold steel according to any one of (1) to (5), further including, in terms of mass %:

$0.0001\% < B \leq 0.0050\%$.

(7) The mold steel according to any one of (1) to (6), further including, in terms of mass %, at least one of:

$0.006\% < S \leq 0.050\%$;
$0.0005\% < Ca \leq 0.2000\%$;
$0.03\% < Se \leq 0.50\%$;
$0.005\% < Te \leq 0.100\%$;
$0.01\% < Bi \leq 0.50\%$; and
$0.03\% < Pb \leq 0.50\%$.

(8) A mold including the mold steel according to any one of (1) to (7).

In the present invention, the "mold" includes not only a mold body but also mold parts such as a pin used by being assembled to it. Further, the "mold" includes a mold including the steel of the present invention, to which surface treatment is performed.

The present invention as described above is characterized in that precipitation of grain boundary carbides and pearlite is suppressed by decreasing the C content, decreasing the Cr content, increasing the Mn content, increasing the Ni content and adding Mo to SUS420J2.

According to such a present invention, hardness, corrosion resistance and annealability are ensured to the same as those of SUS420J2, and moreover, the precipitation of the grain boundary carbides and pearlite can be suppressed.

In SUS420J2, the carbides to be precipitated are Cr-based carbides, and therefore, in order to suppress the precipitation of the carbides, it is effective to decrease the Cr content. On the other hand, however, when the Cr content is excessively decreased, the corrosion resistance or the annealability is deteriorated.

Then, in the present invention, the precipitation of the grain boundary carbides and pearlite has been suppressed while ensuring the good annealability by satisfying $10.50\% \leq Cr < 12.50\%$ without excessively decreasing the Cr content, and adding Mn, Ni and Mo in appropriate amounts under this Cr content.

In the present invention, in order to compensate for a decrease in the hardness due to a decrease in the C content, the N content has been increased. Further, an effect of compensating for the hardness by secondary hardening of Mo has been provided by addition of Mo.

Also, the annealability which is the same as that of SUS420J2 has been ensured by not excessively increasing the Mn, Ni and Mo contents, and the corrosion resistance which is the same as that of SUS420J2 has been ensured by decreasing the C content, not excessively decreasing the Cr content, and increasing the Ni and Mo contents.

In the present invention, further, austenite crystal grain boundaries are pinned with the carbides during the quenching, and in order to maintain fine crystal grains, the V content has been increased. This is for the purpose of compensating for a decrease in Cr-based carbides due to decreasing of the C and Cr contents during the quenching with V-based carbides. A part of V solid-soluted during the quenching exerts an effect of compensating for the hardness by the secondary hardening.

The present invention described above is suitable particularly as a plastic injection molding mold steel or a rubber molding mold steel including injection molding. However, the present invention is also suitable as a steel for a mold such as a cold press forming mold, a hot stamp mold for steel plates or a tableting pestle mold for solidifying a drug powder to tablets.

According to the present invention, a mold steel and a mold can be provided, in which when the mold is produced, difficulty in precipitation of grain boundary carbides, good annealability and difficulty in precipitation of pearlite are satisfied, and when the mold has been obtained, the mold has high hardness and excellent corrosion resistance and has fine prior austenite crystal grains.

DETAILED DESCRIPTION OF THE INVENTION

The reasons for the limitation of the respective chemical components in the present invention are described below.

[For Chemical Components of Above-Described Item (1)]

0.220%≤C≤0.360%

In the case of C<0.220%, it is difficult to stably obtain the high hardness (45 HRC or more) necessary for ensuring the high wear resistance. In the case of 0.360%<C, the corrosion resistance or weldability is deteriorated. Furthermore, in the case of 0.360%<C, the grain boundary carbides or pearlite is easily precipitated. In addition, in the case of 0.360%<C, residual austenite during the quenching is increased, resulting in a difficulty to adjust the hardness or the size in the tempering.

The preferred range of the C content is 0.230%≤C≤0.350% in which a balance of various characteristics is excellent, and it is 0.230%<C≤0.290% when the N content is large and 0.290%≤C≤0.350% when the N content is small.

0.65%≤Si<1.05%

In the case of Si<0.65%, machinability during the machine work is deteriorated. Furthermore, in the case of Si<0.65%, there is also a disadvantage that unevenness of carbide distribution in a metal structure in an annealed state is increased.

On the other hand, in the case of 1.05%≤Si, the thermal conductivity is largely decreased. In order to enhance the productivity of injection molding, it is necessary to shorten the hardening time of plastic injected into a mold, and for that purpose, a mold material having a high thermal conductivity is required. Si has an action to discharge C from a steel, and therefore, in the case of 1.05%≤Si, the grain boundary carbides or pearlite is easily precipitated. Also, delta ferrite is easily generated. When delta ferrite remains, an adverse influence is exerted on mirror polishing properties, and it may act as a starting point of breakage of the mold. The higher the temperature is, the more easily delta ferrite is precipitated. In order to avoid delta ferrite, therefore, a high Cr content and high Si content steel is forced to be subjected to homogenizing heat treatment or hot working at low temperature. By lowering the temperature, it becomes difficult to decrease segregation, which exerts an adverse influence on the mirror polishing properties or texturability.

The preferred Si content range is 0.68%≤Si≤1.02% in which a balance of these characteristics is excellent, and more preferably 0.72%≤Si≤50.98%.

Figure 1:
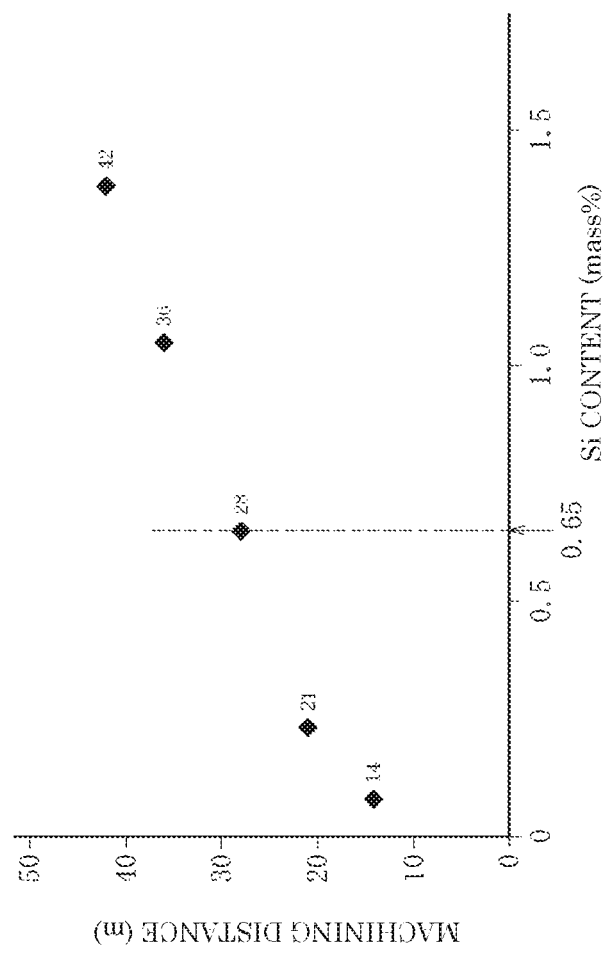
FIG. 1 is a graph showing an influence of the Si content on machinability.

FIG. 1 shows an influence of the Si content on the machinability.

A material containing 0.32% of C, 0.67% of Mn, 0.71% of Ni, 12.2% of Cr, 0.22% of Mo, 0.24% of V, and 0.040% of N as basic components and varied in the Si content was softened to 97 HRB or less by annealing in which the material was cooled from 915° C. to 650° C. at 15° C./Hr, followed by natural cooling. This component system is lower in the C content and the Cr content than SUS420J2, and the carbides are contained in smaller amounts. Therefore, when compared in the same Si content of 1%, the component system has better machinability than SUS420J2. In the case of 0.65%≤Si, the machinability thereof is equivalent to or better than that of the SUS420J2 system. Therefore, in the present invention, the Si content is specified as 0.65%≤Si.

Figure 2:
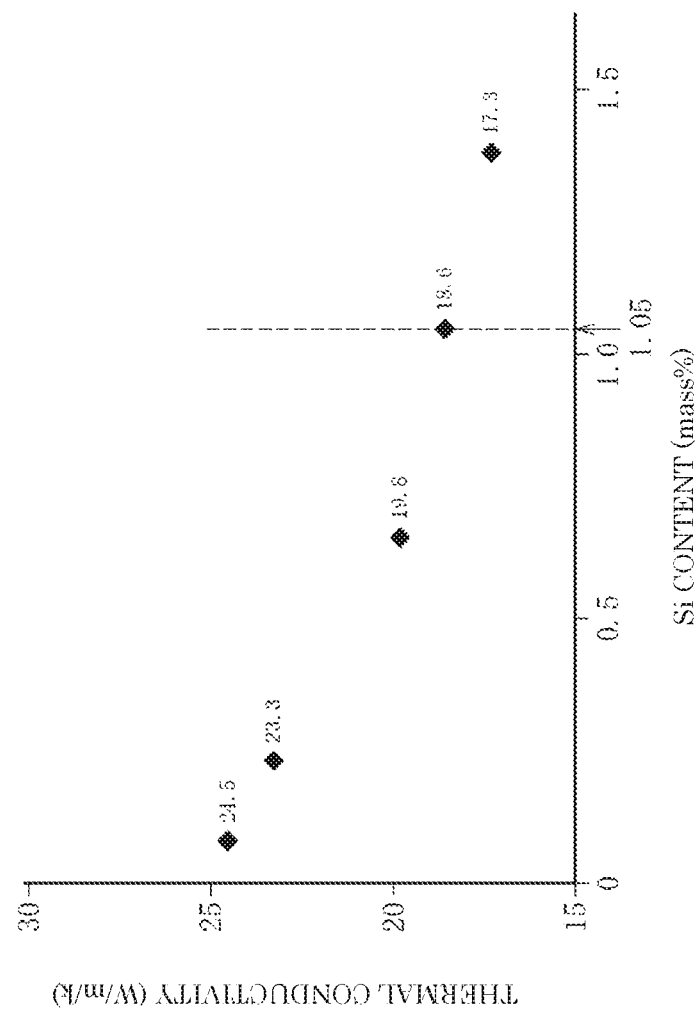
FIG. 2 is a graph showing an influence of the Si content on thermal conductivity.

FIG. 2 shows an influence of the Si content on the thermal conductivity.

A material containing 0.32% of C, 0.67% of Mn, 0.71% of Ni, 12.2% of Cr, 0.22% of Mo, 0.24% of V and 0.040% of N as basic components and varied in the Si content was quenched from 1,030° C., and tempered at 505° C. Thereafter, the thermal conductivity thereof was measured at room temperature. This component system is lower in the C content and the Cr content, but higher in the Mn content and the Ni content than SUS420J2. Therefore, influences of the increased contents and decreased contents are cancelled, and the thermal conductivity thereof is close to that of SUS420J2. In the case of 1.05%≤Si, the thermal conductivity thereof is more deteriorated than that of SUS420J2. Therefore, in the present invention, the Si content is specified as Si<1.05%.

0.43%≤Mn≤0.92%

In the case of Mn<0.43%, the effect of stabilizing austenite to suppress the precipitation of pearlite is small. Furthermore, in the case of Mn<0.43%, a risk of the precipitation of delta ferrite is increased.

On the other hand, in the case of 0.92%<Mn, the annealability is deteriorated. Furthermore, in the case of 0.92%<Mn, the thermal conductivity is also largely decreased. In addition, in the case of 0.92%<Mn, residual austenite during the quenching is increased, resulting in a difficulty to adjust the hardness or the size in the tempering.

The preferred range of the Mn content is 0.46%≤Mn≤0.90% in which a balance of various characteristics is excellent, and more preferably 0.50%≤Mn≤0.88%.

In the case of the high Cr content steel, addition of Ni is very effective for the stabilization of austenite (the suppression of the precipitation of pearlite). However, addition of a large amount of Ni causes a significant increase in cost. Therefore, an increase in material cost is suppressed by using Mn which is an element stabilizing austenite like Ni and inexpensive.

Figure 3:
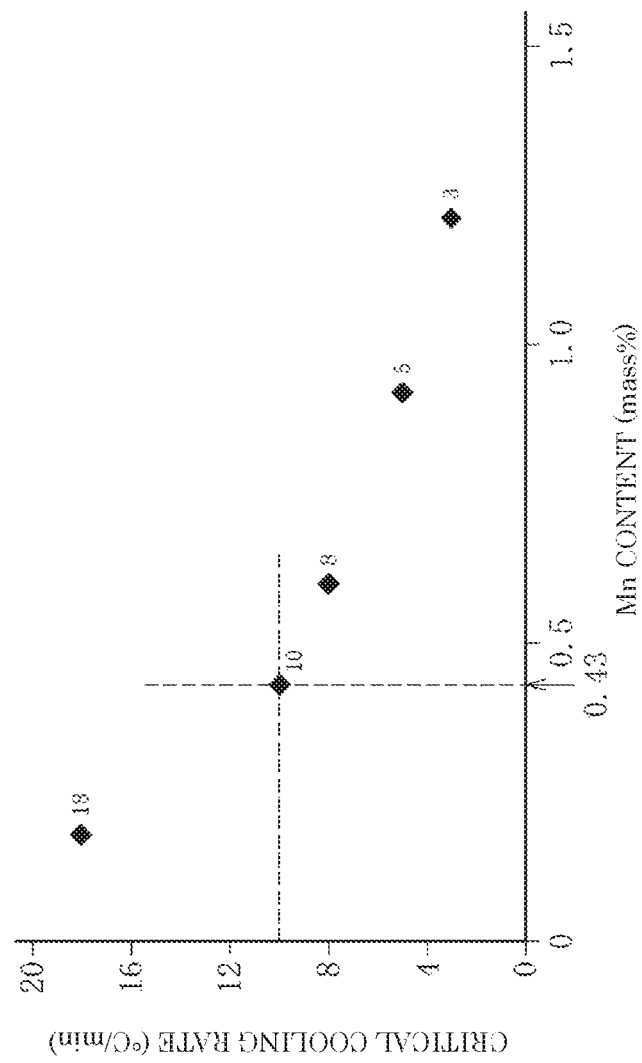
FIG. 3 is a graph showing an influence of the Mn content on pearlite precipitation.

FIG. 3 shows an influence of the Mn content on the critical cooling rate for the pearlite precipitation.

For a material containing 0.31% of C, 0.93% of Si, 0.72% of Ni, 12.3% of Cr, 0.23% of Mo, 0.22% of V and 0.039% of N as basic components and varied in the Mn content, when the cooling rate from 1,030° C. was varied, the lowest cooling rate at which the precipitation of pearlite was stopped was evaluated as the critical cooling rate. The lower the critical cooling rate is, the more hardly pearlite is precipitated. This is therefore preferred.

As shown in FIG. 3, the critical cooling rate decreases with an increase in the Mn content, and reaches 10° C./min at a Mn content of 0.43%. The quenching rate in the inside of the mold is generally from 10 to 40° C./min in a temperature range of 550 to 850° C. in which pearlite is precipitated. Therefore, when the critical cooling rate for the pearlite precipitation is 10° C./min, a risk of generating pearlite in actual quenching in the mold is extremely decreased. Therefore, in the present invention, the Mn content is specified as 0.43%≤Mn.

Figure 4:
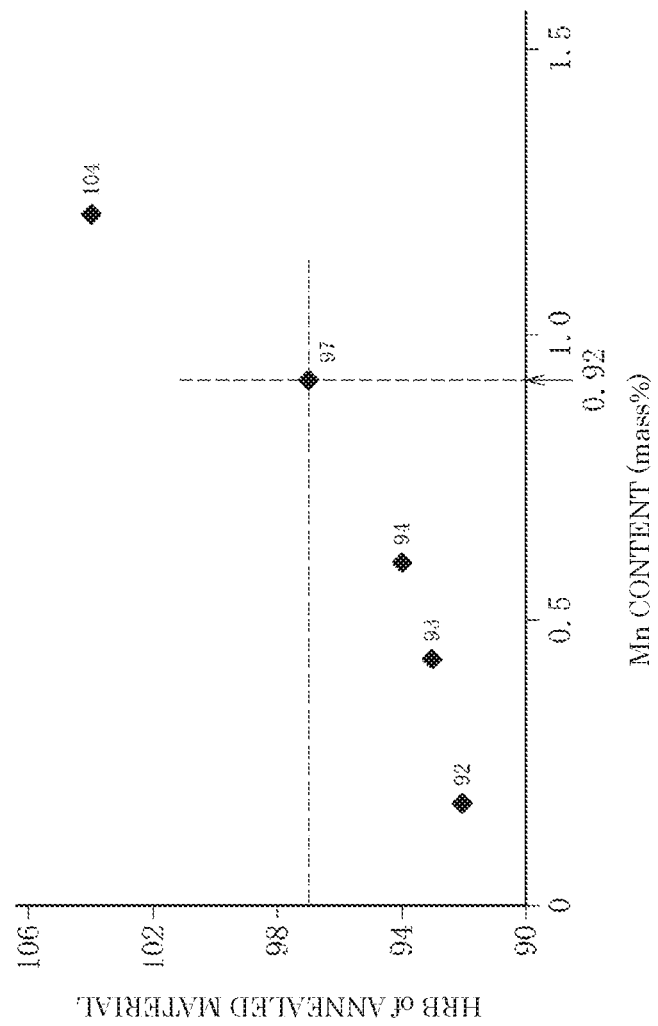
FIG. 4 is a graph showing an influence of the Mn content on annealability.

FIG. 4 shows an influence of the Mn content on the annealability.

When a material containing 0.31% of C, 0.93% of Si, 0.72% of Ni, 12.3% of Cr, 0.23% of Mo, 0.22% of V and 0.039% of N as basic components and varied in the Mn content was cooled from 915° C. to 650° C. at 15° C./Hr, followed by natural cooling, the hardness of the material was shown to the Mn content. When the hardness is 97 HRB or less, the material is preferred because of its softness and easy mechanical workability. The hardness increases with an increase in the Mn content to reach 97 HRB at a Mn content of 0.92%. Therefore, in the present invention, the Mn content is specified as Mn≤0.92%.

0.43%≤Ni≤0.92%

In the case of Ni<0.43%, the effect of stabilizing austenite to suppress the precipitation of pearlite is small. Furthermore, a risk of the precipitation of delta ferrite is increased.

On the other hand, in the case of 0.92%<Ni, the annealability is deteriorated. Furthermore, the thermal conductivity is also largely decreased. In the case of 0.92%<Ni, residual austenite during the quenching is increased, resulting in a difficulty to adjust the hardness or the size in the tempering. Effects of Ni are similar to those of Mn.

The preferred range of the Ni content is 0.45%≤Ni≤0.90% in which a balance of various characteristics is excellent, and more preferably 0.48%≤Ni≤0.88%.

0.67%≤0.5Mn+Ni≤1.30%

In order to achieve both the annealability and the quenchability at high levels, the value of 0.5Mn+Ni is specified as described above. In the case of 0.5Mn+Ni<0.67%, the annealability is satisfactory, but the quenchability is insufficient. Furthermore, in the case of 0.5Mn+Ni<0.67%, a risk of the precipitation of delta ferrite is also increased.

On the other hand, in the case of 1.30%<0.5Mn+Ni, the quenchability is satisfactory, but the annealability is insufficient. In the case of 1.30%<0.5Mn+Ni, residual austenite during the quenching is increased, resulting in a difficulty to adjust the hardness or the size in the tempering.

Figure 5:
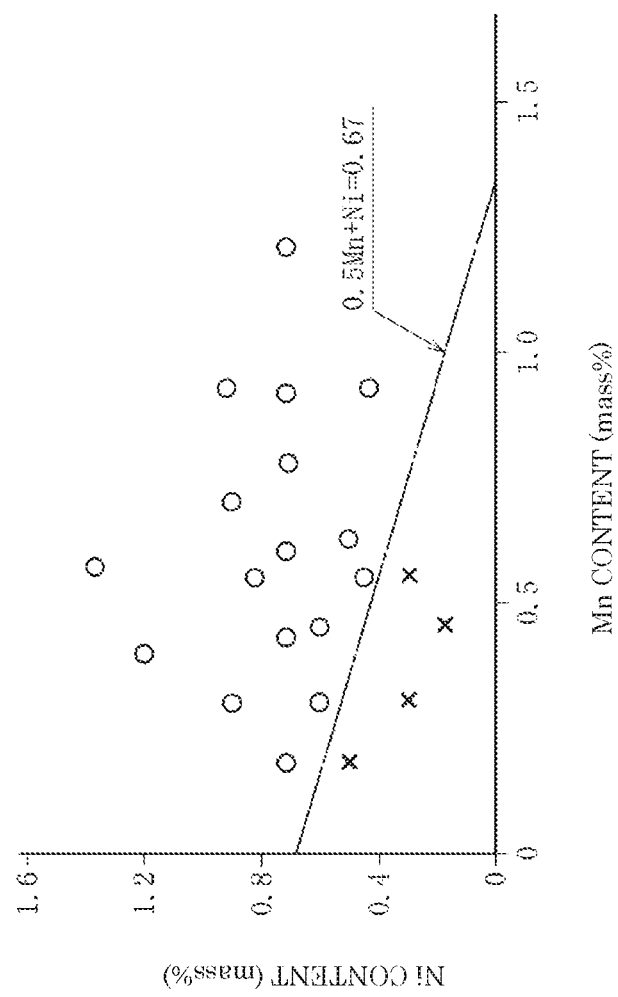
FIG. 5 is a graph showing an influence of the Mn content and the Ni content on pearlite precipitation.

FIG. 5 shows a state of precipitation of pearlite during the quenching at 10° C./min. A material contained 0.32% of C, 0.91% of Si, 12.2% of Cr, 0.23% of Mo, 0.23% of V and 0.038% of N as basic components, and the Mn content and the Ni content were varied. Regions where pearlite was precipitated by cooling from 1,030° C. at 10° C./min were expressed by "x", and regions where pearlite was not precipitated were expressed by "○". A boundary between both is 0.5Mn+Ni=0.67%, and in the case of more than this, a risk of the precipitation of pearlite in the actual quenching in the mold can be considerably decreased. Therefore, 0.5Mn+Ni is specified as 0.67%≤0.5Mn+Ni.

Figure 6:
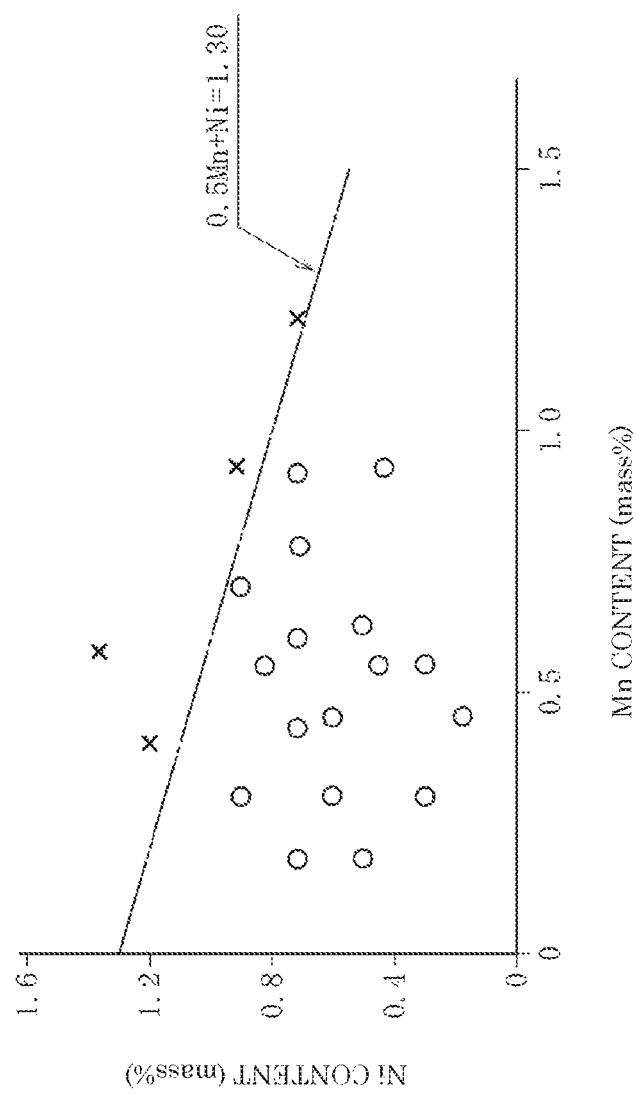
FIG. 6 is a graph showing an influence of the Mn content and the Ni content on annealability.

FIG. 6 shows a state of softening in the annealing at 15° ° C./Hr. A material contained 0.32% of C, 0.91% of Si, 12.2% of Cr, 0.23% of Mo, 0.23% of V and 0.038% of N as basic components, and the Mn content and the Ni content were varied. Regions where the hardness exceeded 97 HRB in the annealing of cooling from 915° C. at 15° C./min were expressed by "x", and regions where the hardness was 97 HRB or less were expressed by "○". A boundary between both is 0.5Mn+Ni=1.30%, and in the case of less than this, the material can be softened by simple annealing. Therefore, 0.5Mn+Ni is specified as 0.5Mn+Ni≤1.30%.

As described above, 0.5Mn+Ni is a very useful index in the case of studying a balance of the quenchability and the annealability.

10.50%≤Cr<12.50%

In the case of Cr<10.50%, the corrosion resistance is deteriorated. Furthermore, in the case of Cr<10.50%, the annealability is also deteriorated.

On the other hand, in the case of 12.50%≤Cr, the grain boundary carbides or pearlite is easily precipitated. Furthermore, delta ferrite is also easily precipitated. In addition, in the case of 12.50%≤Cr, the thermal conductivity is largely decreased. In the case of 12.5%≤Cr, residual austenite during the quenching is increased, resulting in a difficulty to adjust the hardness or the size in the tempering.

The preferred range of the Cr content is 10.70%≤Cr≤12.45% in which a balance of various characteristics is excellent, and more preferably 10.90% ≤Cr≤2.40%.

0.05%≤Mo<0.50%

In the case of M<0.05%, the effect of suppressing the precipitation of pearlite is poor. Furthermore, in the case of M<0.05%, contribution of the secondary hardening is small, and when tempered at high temperature, it becomes difficult to stably obtain a hardness of 45 HRC or more.

On the other hand, in the case of 0.50%≤Mo, the annealability is deteriorated. In addition, delta ferrite is easily precipitated.

The preferred range of the Mo content is 0.07% ≤Mo≤0.46% in which a balance of various characteristics is excellent, and more preferably 0.09%≤Mo≤0.43%.

Figure 7:
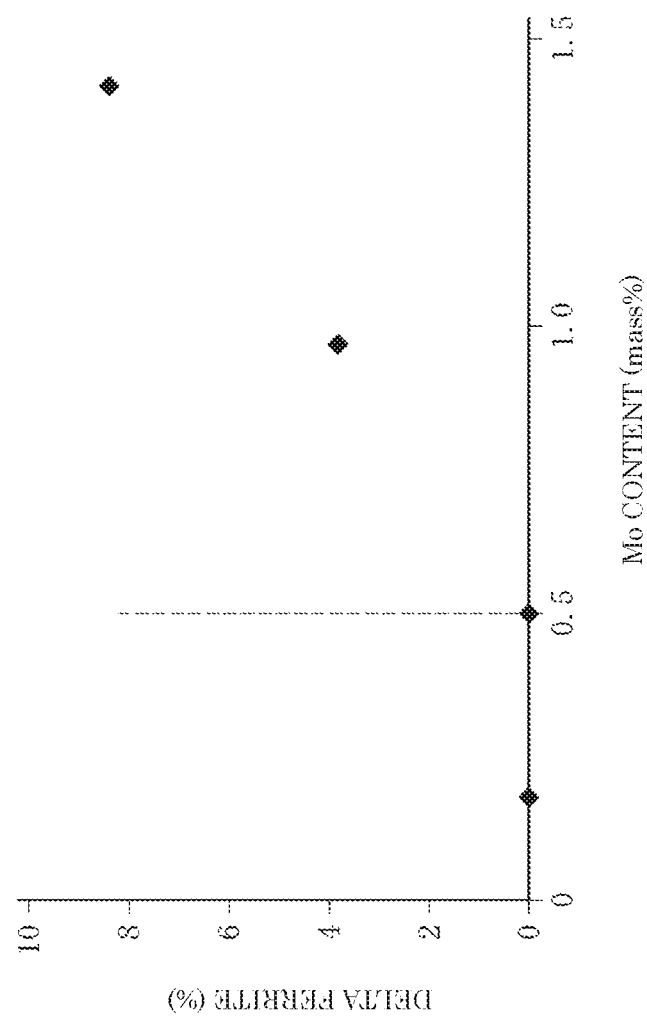
FIG. 7 is a graph showing an influence of the Mo content on delta ferrite precipitation.

FIG. 7 shows an influence of the Mo content on the area ratio of delta ferrite.

A material contained 0.23% of C, 1.04% of Si, 0.45% of Mn, 0.44% of Ni, 12.47% of Cr, 0.46% of V and 0.004% of N as basic components, and the Mo content was varied. The material was heated at 1,280° C. corresponding to the temperature of homogenization for decreasing the segregation, and quenched by rapid cooling. The area ratio of delta ferrite in a structure thereof was evaluated.

As shown in FIG. 7, when the Mo content is decreased, delta ferrite is hardly precipitated. When the Mo content is 0.50% or less, the area ratio is zero. In the present invention, therefore, the Mo content is specified as Mo<0.50%.

0.002%≤V<0.50%

In the case of V<0.002%, the effect of maintaining the fine austenite crystal grains during the quenching is poor, and a risk that the mold is broken during use by a reduction in toughness is increased. Furthermore, in the case of V<0.002%, there is almost no contribution of the secondary hardening. It is therefore difficult to stably obtain a hardness of 45 HRC or more, when tempered at high temperature.

On the other hand, in the case of 0.50%≤V, not only the effect of maintaining the fine crystal grains is saturated, but also an increase in cost is caused. In addition, carbonitrides of V are easily precipitated to rather cause the mold to be easily cracked. In the case of 0.50%≤V, delta ferrite is easily precipitated.

The preferred range of the V content is 0.005%≤V≤0.45% in which a balance of various characteristics is excellent, and more preferably 0.008%≤V≤0.40%.

0.001%≤N≤0.160%

In the case of N<0.001%, the effect of increasing the hardness is poor, and it is difficult to stably obtain a hardness of 45 HRC or more. Furthermore, N has a great influence on the solid solution temperature of V-based carbides. The lower the N content is, the lower the temperature at which the V-based carbides are solid-soluted is. In the case of N<0.001%, therefore, the effect of maintaining the fine austenite crystal grains during the quenching is also poor.

On the other hand, in the case of 0.1609<N, the effect of increasing the strength or maintaining the fine crystal grains is saturated. Furthermore, in the case of 0.160<N, the time and cost of refining required for addition of N are increased to cause an increase in material cost. Additionally, in the case of 0.160%<N, the carbonitrides of V are easily precipitated to cause the mold to be easily cracked.

The preferred range of the N content is 0.003%≤N≤0.155% in which a balance of various characteristics is excellent, and more preferably 0.005% <N≤0.150%.

$0.300\% \leq C+N \leq 0.420\%$

In the case of $C+N<0.300\%$, the effect of increasing the hardness is poor, and it is difficult to stably obtain a hardness of 45 HRC or more. Furthermore, the V-based carbides are decreased during the quenching, and therefore, the effect of maintaining the fine austenite crystal grains is also poor.

On the other hand, in the case of $0.420\%<C+N$, the effect of maintaining the fine crystal grains is saturated. In addition, in the case of $0.420\%<C+N$, the V-based carbonitrides are increased to cause the mold to be easily cracked. In the case of $0.420\%<C+N$, residual austenite increases during the quenching, resulting in a difficulty to adjust the hardness or the size in the tempering.

The preferred range of the C content+the N content is $0.303\% \leq C+N \leq 0.415\%$ in which a balance of various characteristics is excellent, and more preferably $0.306\% \leq C+N \leq 0.410\%$.

[For Chemical Components of Above-Described Item (2)]

In the steel of the present invention, Cr is contained in a large amount, so that the softening resistance thereof is low. When the tempering temperature is high, it is difficult to ensure a hardness of 45 HRC. In such a case, W or Co may be selectively added to ensure the strength. W increases the strength by precipitation of its carbide. Co increases the strength by solid dissolution into a matrix, and at the same time, also contributes to precipitation hardening through changes in carbide morphology. Specifically, it is only required to contain at least one (one element) of:

$0.30\%<W \leq 5.00\%$; and
$0.30\%<Co \leq 4.00\%$.

Both the elements cause saturation of the characteristics and a significant increase in cost, when the contents thereof exceed the predetermined amounts.

[For Chemical Components of Above-Described Item (3)]

When the quenching heating temperature is increased or the quenching heating time is prolonged by unexpected equipment troubles, etc., there is a concern that various characteristics may be deteriorated due to coarsening of the crystal grains. For such cases, Nb, Ta, Ti and Zr are selectively added, and coarsening of the austenite crystal grains can be suppressed by fine precipitates formed by these elements. Specifically, it is only required to contain at least one of:

$0.004\%<Nb \leq 0.100\%$;
$0.004\%<Ta \leq 0.100\%$;
$0.004\%<Ti \leq 0.100\%$; and
$0.004\%<Zr \leq 0.100\%$.

All of the elements excessively form carbides, nitrides or oxides thereof to cause a decrease in the impact value or the mirror polishing properties, when the contents thereof exceed the predetermined amounts.

[For Chemical Components of Above-Described Item (4)]

Similarly, in order to suppress coarsening of the austenite crystal grains, $0.10\%<Al \leq 1.20\%$ can be contained. Al combines with N to form AlN, which has an effect of suppressing transfer of crystal grain boundaries (namely, grain growth) of austenite and is effective for maintenance of the fine grains.

Also, Al forms a nitride in the steel and contributes to precipitation strengthening, so that it also has an action of increasing the surface hardness of a steel material subjected to nitriding treatment. Use of an Al-containing steel material is effective for the mold in which nitriding treatment is performed for pursuing the higher wear resistance.

However, the content of Al exceeding the predetermined amount causes a decrease in the thermal conductivity or the toughness.

[For Chemical Components of Above-Described Item (5)]

In recent years, a mold tends to be increased in size by an increase in size of parts or integration thereof. The large mold is hardly cooled. For this reason, when the large mold of a steel material with low quenchability is quenched, ferrite, pearlite or coarse bainite is precipitated during the quenching to deteriorate various characteristics. The steel of the present invention has considerably high quenchability, and therefore, there is a little concern about such deterioration. However, in case the extremely large mold is treated by a quenching plan of weak cooling intensity. Cu can be added to further increase the quenchability. Specifically, it is only required to contain:

$0.30\%<Cu \leq 3.0\%$.

Cu has also an effect of increasing the hardness by age precipitation. When the content of Cu exceeds the predetermined amount, segregation becomes remarkable to cause deterioration in the mirror polishing properties or the texturability.

[For Chemical Components of Above-Described Item (6)]

As a measure for improving the quenchability, addition of B is also effective. Specifically, $0.0001\%<B \leq 0.0050\%$ is allowed to be contained B loses the effect of improving the quenchability, when BN is formed. It is therefore necessary that B is present alone in the steel. Specifically, B may be prevented from combining with N by forming a nitride with an element having stronger affinity with N than B. Examples of such elements include the elements described in the above-described item (3). The elements described in item (3) have an effect of fixing N, even when present at an impurity level, but are sometimes added within the ranges specified in item (3), depending on the N content. Even when B combines with N in the steel to form BN, in the case where excessive B is present in the steel, it increases the quenchability.

B is also effective for improvement of the machinability. In the cases of improving the machinability, it is only required to form BN. BN is similar to graphite in properties, and decreases machining resistance and at the same time improves chip breakability. When B and BN are present in the steel, the quenchability and the machinability are improved at the same time.

[For Chemical Components of Above-Described Item (7)]

In order to improve the machinability, it is also effective to selectively add S, Ca, Se, Te, Bi and Pb. Specifically, it is only required to contain at least one of:

$0.006\%<S \leq 0.050\%$;
$0.0005\%<Ca \leq 0.2000\%$;
$0.03\%<Se \leq 0.50\%$;
$0.005\%<Te \leq 0.100\%$;
$0.01\%<Bi \leq 0.50\%$; and
$0.03\%<Pb \leq 0.50\%$.

All of the elements cause saturation of the machinability, deterioration in the hot workability, and a decrease in the impact value or the mirror polishing properties, when the contents thereof exceed the predetermined amounts.

EXAMPLES

For 20 kinds of steels shown in Table 1, difficulty in precipitation of grain boundary carbides, annealability, difficulty in precipitation of pearlite, grain size during quenching, quenching tempering hardness and corrosion resistance were examined.

All of 5 kinds of Comparative Steels are used for use requiring hardness or corrosion resistance. Comparative Steel 1 is JIS SUS420J2, Comparative Steel 2 is JIS SUS403, Comparative Steel 3 is JIS SUH1, Comparative Steel 4 is JIS SUH600, and Comparative Example 5 is a steel sold on the market.

Materials of the 20 kinds of steel shown in Table 1 were each produced by the following procedure. First, molten steel was cast into a 50 kg ingot, and thereafter subjected to homogenizing treatment at 1,240° C. for 12 hours. Then, it was formed into a rod shape having a rectangular cross-section of 60 mm×45 mm. Subsequently, normalizing by heating at 1,020° C. and rapid cooling, and tempering by heating at 620° C. were performed. Further, after heating at 860° C. or 915° C., slow cooling was conducted at 15° C./Hr, thereby performing annealing. Test specimens were cut out from this rod steel and used for various examinations.

Thereafter, the above-mentioned test specimen was corroded, and the grain boundary carbides were colored. A structure thereof was observed under an optical microscope at 1,000 magnifications. When the grain boundary carbides were remarkably observed, the difficulty in precipitation was determined to be unacceptable and indicated by "x". When the grain boundary carbides were slightly observed, the difficulty in precipitation was indicated by "Δ". When grain boundary carbides were not almost observed, the difficulty in precipitation was determined to be acceptable and indicated by "○".

The results thereof are as shown in Table 2. Comparative Steel 1 in which C and Cr are contained in large amounts is evaluated as "x". Comparative Steel 3 in which the C content is high but the Cr content is as low as about 9% is evaluated as "Δ", and the others are evaluated as "○". In Comparative Steel 1, precipitation of the grain boundary carbides becomes remarkable also in an actual mold pro-

TABLE 1

| | Chemical Components (mass %) | | | | | | | | | | |
| --- | --- | --- | --- | --- | --- | --- | --- | --- | --- | --- | --- |
| | C | Si | Mn | Ni | Cr | Mo | V | N | C + N | 0.5 Mn + Ni | Others |
| Invention Steel 1 | 0.318 | 0.93 | 0.65 | 0.65 | 12.33 | 0.23 | 0.23 | 0.040 | 0.358 | 0.975 | |
| Invention Steel 2 | 0.321 | 0.92 | 0.65 | 0.65 | 12.35 | 0.24 | 0.35 | 0.015 | 0.336 | 0.975 | |
| Invention Steel 3 | 0.269 | 0.92 | 0.65 | 0.65 | 12.34 | 0.23 | 0.23 | 0.090 | 0.359 | 0.975 | |
| Invention Steel 4 | 0.272 | 0.94 | 0.65 | 0.65 | 12.36 | 0.23 | 0.35 | 0.065 | 0.337 | 0.975 | |
| Invention Steel 5 | 0.311 | 0.66 | 0.44 | 0.91 | 10.51 | 0.06 | 0.003 | 0.009 | 0.320 | 1.130 | W: 3.94 |
| Invention Steel 6 | 0.290 | 0.71 | 0.53 | 0.87 | 10.81 | 0.11 | 0.011 | 0.021 | 0.311 | 1.135 | Co: 2.02 |
| Invention Steel 7 | 0.248 | 0.76 | 0.73 | 0.73 | 11.11 | 0.16 | 0.024 | 0.073 | 0.321 | 1.095 | Nb: 0.03 |
| Invention Steel 8 | 0.304 | 0.68 | 0.82 | 0.82 | 11.32 | 0.21 | 0.06 | 0.030 | 0.334 | 1.230 | Al: 0.23 |
| Invention Steel 9 | 0.337 | 0.86 | 0.91 | 0.44 | 11.48 | 0.26 | 0.17 | 0.048 | 0.385 | 0.895 | Cu: 0.98 |
| Invention Steel 10 | 0.348 | 0.91 | 0.59 | 0.50 | 11.64 | 0.31 | 0.29 | 0.057 | 0.405 | 0.795 | Ti: 0.04, B: 0.004 |
| Invention Steel 11 | 0.359 | 0.97 | 0.64 | 0.63 | 11.80 | 0.36 | 0.11 | 0.003 | 0.362 | 0.950 | S: 0.013 |
| Invention Steel 12 | 0.240 | 1.04 | 0.77 | 0.77 | 11.94 | 0.41 | 0.41 | 0.081 | 0.321 | 1.155 | W: 2.96, Co: 1.03 |
| Invention Steel 13 | 0.221 | 0.83 | 0.87 | 0.54 | 12.07 | 0.45 | 0.48 | 0.099 | 0.320 | 0.975 | Ta: 0.02, Zr: 0.02 |
| Invention Steel 14 | 0.227 | 0.74 | 0.44 | 0.46 | 12.21 | 0.49 | 0.44 | 0.114 | 0.341 | 0.680 | Bi: 0.18 |
| Invention Steel 15 | 0.292 | 0.81 | 0.90 | 0.84 | 12.49 | 0.33 | 0.38 | 0.127 | 0.419 | 1.290 | Bi: 0.10, Pb: 0.15 |
| Comparative Steel 1 | 0.400 | 0.90 | 0.40 | 0.20 | 13.00 | 0.01 | 0.002 | 0.015 | 0.415 | 0.400 | |
| Comparative Steel 2 | 0.120 | 0.35 | 0.75 | 0.20 | 12.00 | 0.01 | 0.002 | 0.013 | 0.133 | 0.575 | |
| Comparative Steel 3 | 0.470 | 3.20 | 0.45 | 0.20 | 9.30 | 0.01 | 0.002 | 0.012 | 0.482 | 0.425 | |
| Comparative Steel 4 | 0.170 | 0.35 | 0.75 | 0.20 | 12.00 | 0.45 | 0.25 | 0.075 | 0.245 | 0.575 | Nb: 0.40 |
| Comparative Steel 5 | 0.250 | 0.28 | 0.60 | 1.40 | 13.30 | 0.35 | 0.35 | 0.110 | 0.360 | 1.700 | |

<Difficulty in Precipitation of Grain Boundary Carbides>

Using a block of 15 mm×15 mm×25 mm cut out from the above-mentioned material as a test specimen, evaluation was performed by an experiment simulating a hot working process in a factory. Grain boundary carbides are precipitated during cooling to 800° C. after hot working. Therefore, the block of the test specimen was heated at 1,180° C. simulating the hot working, and cooled to 800° C. at 5° C./min, followed by rapid cooling to freeze the state of the carbides.

duction process, and there is a concern about deterioration of mirror polishing properties or cracking during use of the mold. Also in Comparative Steel 3, when the cooling rate after the hot working is further low or when the austenite grain size is further large, there is a concern that the grain boundary carbides are considerably precipitated.

On the other hand, for the other steels including Invention Steels, the grain boundary carbides are judged to be hardly precipitated also in actual molds. That is, a risk of deterioration in the mirror polishing properties or cracking is considered to be low.

TABLE 2

| | Examination Items | | | | | | |
| --- | --- | --- | --- | --- | --- | --- | --- |
| | Presence or Absence of Precipitation of Grain Boundary Carbides | Annealability | Presence or Absence of Precipitation of Pearlite | Grain Size | Hardness | Corrosion Resistance | Overall Judgment |
| Invention Steel 1 | ○ | ○ | ○ | ○ | ○ | ○ | ○ |
| Invention Steel 2 | ○ | ○ | ○ | ○ | ○ | ○ | ○ |
| Invention Steel 3 | ○ | ○ | ○ | ○ | ○ | ○ | ○ |
| Invention Steel 4 | ○ | ○ | ○ | ○ | ○ | ○ | ○ |
| Invention Steel 5 | ○ | ○ | ○ | ○ | ○ | ○ | ○ |
| Invention Steel 6 | ○ | ○ | ○ | ○ | ○ | ○ | ○ |
| Invention Steel 7 | ○ | ○ | ○ | ○ | ○ | ○ | ○ |

TABLE 2-continued

| | Examination Items | | | | | | |
|---|---|---|---|---|---|---|---|
| | Presence or Absence of Precipitation of Grain Boundary Carbides | Annealability | Presence or Absence of Precipitation of Pearlite | Grain Size | Hardness | Corrosion Resistance | Overall Judgment |
| Invention Steel 8 | ○ | ○ | ○ | ○ | ○ | ○ | ○ |
| Invention Steel 9 | ○ | ○ | ○ | ○ | ○ | ○ | ○ |
| Invention Steel 10 | ○ | ○ | ○ | ○ | ○ | ○ | ○ |
| Invention Steel 11 | ○ | ○ | ○ | ○ | ○ | ○ | ○ |
| Invention Steel 12 | ○ | ○ | ○ | ○ | ○ | ○ | ○ |
| Invention Steel 13 | ○ | ○ | ○ | ○ | ○ | ○ | ○ |
| Invention Steel 14 | ○ | ○ | ○ | ○ | ○ | ○ | ○ |
| Invention Steel 15 | ○ | ○ | ○ | ○ | ○ | ○ | ○ |
| Comparative Steel 1 | x | ○ | x | ○ | ○ | ○ | x |
| Comparative Steel 2 | ○ | ○ | ○ | x | x | ○ | x |
| Comparative Steel 3 | Δ | x | x | ○ | ○ | x | x |
| Comparative Steel 4 | ○ | ○ | ○ | x | x | ○ | x |
| Comparative Steel 5 | ○ | x | ○ | x | ○ | ○ | x |

<Annealability>

Using the above-mentioned block of 15 mm×15 mm×25 mm as a test specimen, evaluation was performed by an experiment simulating an annealing process in a factory. The test specimen was heated at 860° C. (Comparative Steel 2, Comparative Steel 3 and Comparative Steel 4) or 915° C. (the other steels) and kept for 120 minutes. Thereafter, it was cooled to 650° C. at 15° C./Hr, followed by natural cooling. Then, the HRB hardness of the test specimen was measured, and it was confirmed whether or not softened to the hardness at which the machine work could be easily performed. When the hardness was 97 HRB or less, the annealability was determined to be acceptable and indicated by "○". When the hardness is more than 97 HRB, the annealability was determined to be unacceptable and indicated by "x".

The results thereof are as shown in Table 2. Comparative Steel 3 and Comparative Steel 5 exceed 97 HRB in the hardness after the annealing, and are not sufficiently softened. They are therefore evaluated as "x". In Comparative Steel 3, contribution of solid solution hardening was large because of its high Si content, and the hardness thereof was high even after the annealing. Comparative Steel 5 did not form the structure containing spherical carbides and ferrite, but formed bainite, because of it high Ni content and good annealability. Therefore, the hardness thereof was high.

For Comparative Steel 3 and Comparative Steel 5, also during the actual mold production, there is a high possibility of shortening the tool life in rough machining of the mold, or decreasing the machining efficiency.

In contrast, for the other steels including Invention Steels, the hardness after the annealing is 97 HRB or less. It is therefore considered that such problems do not occur.

<Difficulty in Precipitation of Pearlite>

A test specimen of 4 mm (diameter)×10 mm was heated at 1,030° C., and thereafter cooled to 100° C. at 10° C./min. After cooling, a metal structure was observed at 400 magnifications to confirm the presence or absence of precipitation of pearlite. When pearlite was not precipitated, the difficulty in precipitation was determined to be acceptable and indicated by "○", and when pearlite was precipitated even slightly, the difficulty in precipitation was determined to be unacceptable and indicated by "x".

The results thereof are as shown in Table 2. Comparative Steel 1 and Comparative Steel 3 are evaluated as "x". The quench-cooling rate in the inside of the mold is generally from 10 to 40° C./min in a temperature range of 550 to 850° C. at which pearlite is precipitated, and therefore, the precipitation of pearlite becomes unavoidable in the inside of the mold using Comparative Steel 1 or Comparative Steel 3 to increase a risk of breakage during use thereof as the mold.

On the other hand, for the other steels including Invention Steels, pearlite was not precipitated, and also in the case when the mold is actually quenched, it can be judged that precipitation of pearlite does not occur.

<Grain Size During Quenching>

In actual mold quenching, the mold is sometimes kept for a time as long as about 5 hours. The grain size of austenite under such conditions was examined. Using the above-mentioned block of 15 mm×15 mm×25 mm as a test specimen, it was kept at 1,030° C. for 5 hours, and thereafter rapidly cooled to produce martensite. This structure was corroded to develop prior austenite crystal grain boundaries, and the grain size number was evaluated. When the grain size number was 5 or more, the grain size was determined to be acceptable and indicated by "○", and when the grain size number was less than 5, the grain size was determined to be unacceptable and indicated by "x".

The results thereof are as shown in Table 2. In Comparative Steel 2 and Comparative Steel 4 which contain C in small amounts, carbides for suppressing transfer of austenite crystal grain boundaries are also decreased. Therefore, the results thereof are evaluated as "x". In Comparative Steel 5, since a γ memory effect was developed during the quenching because of its poor annealability, the result thereof is evaluated as "x". In the case of Comparative Steel 2, Comparative Steel 4 and Comparative Steel 5, there is a concern that also in the actual mold quenching, the crystal grains are coarsened to cause easy cracking during use thereof as the mold.

On the other hand, for the other steels including Invention Steels, the results thereof are evaluated as "○", and it is considered that coarsening of the crystal grains does not occur.

<Quenching Tempering Hardness>

The test specimen (in which martensite was produced) used in evaluation of the "Grain Size during Quenching" described above was tempered at 470-520° C. for 2 hours. The maximum hardness obtained in this tempering temperature range was evaluated. In order to ensure the wear resistance, the quenching tempering hardness is preferably 45 HRC or more. When the hardness was 45 HRC or more, it was determined to be acceptable and indicated by "○", and when the hardness was less than 45 HRC, it was determined to be unacceptable and indicated by "x".

The results thereof are as shown in Table 2. In Comparative Steel 2 and Comparative Steel 4, a hardness of 45 HRC or more was not obtained because of their low C content, but all the other steels had a hardness of 45 HRC or more. That is, for Invention Steels, a hardness of 45 HRC or more necessary for ensuring the wear resistance was obtained. Needless to say, it is also possible to decrease the hardness by adjusting tempering conditions.

<Corrosion Resistance>

The test specimen used for evaluation of the above-mentioned "Quenching Tempering Hardness" was diverted as a test specimen. The test specimen after measurement of the hardness was subjected to mirror polishing and exposed to an environment of a humidity of 98% and a temperature of 50° C. for 24 hours, followed by visual observation of a rusting situation. When a dot-like corroded part was not generated, the corrosion resistance was determined to be acceptable and indicated by "○", and when the corroded part was generated even in one place, the corrosion resistance was determined to be unacceptable and indicated by "x". In all of the steels evaluated, whole surfaces thereof were not corroded under these conditions, and a difference occurred between generation of dot-like local corroded parts and no generation thereof, because of their high Cr content.

The results thereof are as shown in Table 2. In Comparative Steel 3, the corrosion resistance is poor, because of its high C content and low Cr content, and the results thereof are evaluated as "x". The other Comparative Steels and Invention Steels have high corrosion resistance, because of their high Cr content.

<Overall Judgment>

To summarize the above examination results, in Comparative Steel 1, it can be judged that the grain boundary carbides or pearlite is easily precipitated particularly in the large mold, and there is a problem of increasing a risk of deterioration in the mirror polishing properties or cracking.

Comparative Steel 2, Comparative Steel 3 and Comparative Steel 4 have a difficulty in any one of basic performances such as high hardness and high corrosion resistance. The other defects include the grain size for Comparative Steel 2, the annealability and the precipitation of pearlite for Comparative Steel 3, and the grain size for Comparative Steel 4.

Comparative Steel 5 has difficulties in the annealability and the grain size during the quenching, and there is a concern that the tool life or productivity in the machine work may be decreased, or that the mold obtained may be easily cracked. As described above, each Comparative Steel has problems in at least two items.

In contrast, 15 kinds of Invention Steels have no problems in all items. Invention Steels have the difficulty in precipitation of the grain boundary carbides, the annealability, the difficulty in precipitation of pearlite and fineness of the crystal grains while ensuring the basic performances such as high hardness and high corrosion resistance. Accordingly, also in the actual mold, it can be expected to exert high mirror polishing properties and difficulty in cracking, in addition to high hardness and high corrosion resistance.

As described above, in the steel of the present invention, in order to suppress the precipitation of the grain boundary carbides or pearlite, it was performed to decrease the C content, decrease the Cr content, increase the Mn content, increase the Ni content and add Mo, based on SUS420J2 (C: 0.4%, Mn: 0.4%, Ni: 0.2%, Cr: 13%, Mo: 0.01% and N: 0.015%). Furthermore, in order to compensate for a decrease in the hardness due to a decrease in the C content, the N content was increased. The addition of Mo has also an effect of suppressing the precipitation of pearlite or ensuring the secondary hardening amount. The annealability which is the same as that of SUS420J2 was ensured by not excessively increasing the Mn, Ni and Mo contents, and the corrosion resistance which is the same as that of SUS420J2 was ensured by decreasing the C content, and not excessively decreasing the Cr content. In addition, the austenite crystal grain boundaries were pinned with the carbides during the quenching, and in order to maintain the fine crystal grains, V was added. This is for the purpose of compensating for a decrease in Cr-based carbides due to decreasing of the C and Cr contents during the quenching with V-based carbides. A part of V solid-soluted during the quenching exerts an effect of compensating for the hardness by the secondary hardening. By such measures, when the mold is produced, the steel of the present invention has the difficulty in precipitation of the grain boundary carbides, the good annealability and the difficulty in precipitation of pearlite, and when the steel has been formed into the mold, it has high hardness and excellent corrosion resistance, and the prior austenite crystal grains are kept fine. It is therefore suitably applied to the mold for molding plastic products.

While embodiments of the present invention have been described in detail above, it should be understood that they have been presented by way of example only.

For example, it is also effective that the steel of the present invention is subjected to surface shot blast, nitriding treatment, PVD treatment, CVD treatment, plating treatment or other surface modification treatment and then used.

Also, the steel of the present invention can be applied to a powder or a plate used for mold production by powder or plate laminate shaping, and it is also possible to be used in a bar-like shape for weld repair of a main body or parts of the mold. Thus, embodiments in which various changes are made without departing from the gist of the present invention are possible.

The present application is based on Japanese Patent Application No. 2016-048581 filed on Mar. 11, 2016 and Japanese Patent Application No. 2017-39355 filed on Mar. 2, 2017, the contents of which are incorporated herein by reference.

What is claimed is:

1. A mold steel having a composition comprising, in terms of mass %:
   0.220%≤C≤0.360%;
   0.65%≤Si<1.05%;
   0.43%≤Mn≤0.92%;
   0.43%≤Ni≤0.92%;
   0.67%≤Mn+Ni≤1.30%;
   10.50%≤Cr<12.50%;
   0.05%≤Mo<0.50%;
   0.002%≤V<0.50%;
   0.001%≤N≤0.048%; and
   0.300%≤C+N≤0.420%,
   with the remainder being Fe and unavoidable impurities.

2. The mold steel according to claim 1, further comprising, in terms of mass %, at least one of:
   at least one of:
      0.30%<W≤5.00%; and
      0.30%<Co≤4.00%,
   at least one of:
      0.004%<Nb≤0.100%;
      0.004%<Ta≤0.100%;
      0.004%<Ti≤0.100%; and
      0.004%<Zr≤0.100%, 0.10%<Al≤1.20%,
0.30%<Cu≤3.0%,
0.0001%<B≤0.0050%, and
at least one of:
   0.006%<S≤0.050%;
   0.0005%<Ca≤0.2000%;
   0.03%<Se≤0.50%;
   0.005%<Te≤0.100%;
   0.01%<Bi≤0.50%; and
   0.03%<Pb≤0.50%.

3. A mold comprising the mold steel according to claim 1.
4. A mold comprising the mold steel according to claim 2.

* * * * *

UNITED STATES PATENT AND TRADEMARK OFFICE
CERTIFICATE OF CORRECTION

PATENT NO.         : 10,508,327 B2
APPLICATION NO.    : 15/450352
DATED              : December 17, 2019
INVENTOR(S)        : M. Kawano It is certified that error appears in the above-identified patent and that said Letters Patent is hereby corrected as shown below:

In the Claims

Column 18, Line 51 (Claim 1), please insert --0.5-- between "≤" and "Mn".

Signed and Sealed this
Fourteenth Day of July, 2020

Andrei Iancu
*Director of the United States Patent and Trademark Office*